Oct. 11, 1966     W. E. CURRIE     3,278,204
SWIVEL COUPLING
Filed Jan. 29, 1964
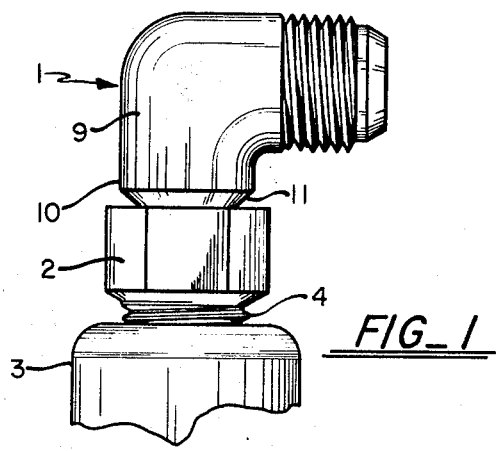
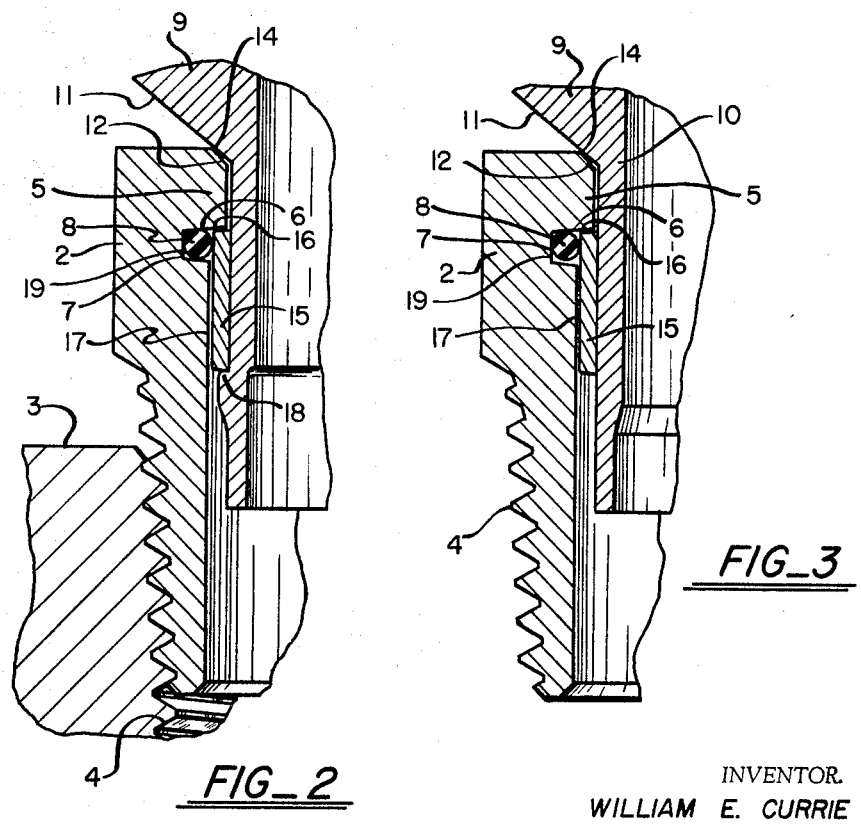
INVENTOR.
WILLIAM E. CURRIE
BY
Oberlin, Maky & Donnelly
ATTORNEYS

United States Patent Office 3,278,204
Patented Oct. 11, 1966

3,278,204
SWIVEL COUPLING
William E. Currie, Cleveland Heights, Ohio, assignor to Parker-Hannifin Corporation, Cleveland, Ohio, a corporation of Ohio
Filed Jan. 29, 1964, Ser. No. 341,062
7 Claims. (Cl. 285—281)

The present invention relates generally as indicated to a swivel coupling and has for its principal objects the provision of a swivel coupling in which the coupling members can be relatively rotated while under fluid pressure, in which the coupling members are sealed by a resiliently deformable packing ring confined in a chamber against extrusion under the influence of fluid pressure in the coupling, in which radially overlapped interengaged faces of the coupling members are of hard material for low friction turning, and in which the coupling members are assembled in a novel manner.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawing:

FIG. 1 is a side elevation view of a swivel coupling according to the present invention;

FIG. 2 is an enlarged radial cross-section view of the FIG. 1 swivel coupling; and FIG. 3 is a radial cross-section view illustrating the coupling herein prior to final assembly.

Referring now more particularly to the drawing, the swivel coupling 1 herein comprises a coupling member 2 which is externally threaded for screwing into a boss 3 or the like, and it is to be understood that instead of the tapered pipe threads 4 shown herein, the boss 3 and coupling member 2 may be formed with interengaged threads of uniform pitch diameter employing a packing ring therebetween to effect a fluid-tight joint, and a locknut on coupling member 2 frictionally engaging boss 3. The coupling member 2 is formed at its upper end with an inturned flange 5 providing an abutment face 6 which in the present case, is tapered at a 5° angle. Adjacent the abutment face 6, the coupling member 2 is formed with an internal groove 7 in which is disposed a resiliently deformable packing ring 8, which preferably is an O-ring made of rubber-like material. The coupling member 2 may, for example, be made of steel and at least the abutment face 6 is hardened as by case-hardening. If desired, the entire coupling member 2 may be made of hard material, although this would increase the cost of manufacture.

The other coupling member 9 which interfits with the coupling member 2 is shown as an elbow fitting having a tubular leg 10 extending into the coupling member 2. The coupling member 9 is locked in the coupling member 2 against axial movement in either direction by inserting the tubular leg 10 so that its beveled shoulder 11 engages the countersink 12 at the upper end of the coupling member 2, it being noted that the beveled shoulder 11 and countersink 12 are tapered at different angles to provide a line contact at 14. With the tubular leg 10 thus inserted, a sleeve 15 of hard material is axially pushed over the tubular leg 10 until the upper end of sleeve 15 engages the abutment face 6, the ends of the sleeve 15 being tapered at a 3° angle so as to provide a line contact at 16. Both ends of sleeve 15 are the same so that either end thereof may be engaged with abutment face 6. The outside diameter of the sleeve 15 is a close fit in the bore 17 of the coupling member 2 to provide a relatively long bearing from 16 to the lower end of sleeve 15 to prevent relative tilting or cocking of the coupling members 2 and 9. The sleeve 15 is permanently affixed to the tubular leg 10 by swaging or expansion from the condition of FIG. 3 to the condition of FIG. 2, thus to lock the sleeve 15 on the coupling member 9 by means of the locking shoulder 18. Because the expansion is effected above the lower end of the sleeve 15, the tubular leg 10 is expanded into fluid tight sealing contact in the bore of the sleeve 15. The sleeve 15, as aforesaid, is of hard material, e.g. Rockwell C-45, and therefore, it will not perceptibly expand thus to avoid binding action between the sleeve 15 and the bore 17 of the coupling member 2. However, the sleeve 15 will be under hoop tension due to expansion of the tubular leg 10 to maintain the seal.

The sleeve 15 is thus locked on the tubular leg 10 of the coupling member 9 while the line contacts at 14 and 16 are maintained. When the sleeve 15 is thus locked on the tubular leg 10, the O-ring 8 is squeezed radially between the outside diameter of the sleeve 15 and the wall 19 of the undercut or groove 7 to establish a fluid-tight seal in all rotary positions of the coupling member 9 with respect to the other coupling member 2.

When there is fluid under pressure in the swivel coupling 1, the coupling member 9 will be urged upwardly as viewed in FIG. 2 to maintain line contact at 16 (while contact pressure at 14 is decreased), and thus there will be no gap into which fluid under pressure, even of very great magnitude, could cause extrusion of the packing ring 8. Moreover, because the sleeve 15 is of hard material, and the abutment face 6 likewise is hard, the friction at the line contact 16 will be relatively low whereby the copuling member 9 may be freely turned relative to coupling member 2 even under high fluid pressure.

Other modes of applying the principle of the invention may be employed, change being made as regards the details described, provided the features stated in any of the following claims, or the equivalent of such, be employed.

I therefore particularly point out and distinctly claim as my invention:

1. A swivel coupling comprising an outer tubular coupling member having a stepped bore therein, an internal annular groove in the wall of the larger diameter portion of said bore adjacent the step therein, said step being a radial continuation of one of the walls of said groove, an inner tubular coupling member inserted in said bore, said inner member having a sleeve affixed thereto in sealing contact therearound within said larger diameter portion of said bore, the outer diameter of said sleeve being greater than the smaller diameter portion of said stepped bore but less than said larger diameter portion for engagement with said step, said inner member having a radially outwardly projecting shoulder means engaging a shoulder means on said outer member with the distance between said shoulder means on said inner and outer members and their respective sleeve and step being substantially the same for maintaining said sleeve in continuous engagement with said step, and a packing ring in said groove in fluid tight sealing contact with the walls of said groove and said sleeve, the interengagement of said step and sleeve closing said groove against extrusion of said packing ring under the influence of fluid pressure in said coupling.

2. The swivel coupling of claim 1 wherein said step and the end of said sleeve which engages said step are hard to resist deformation thereof under axial thrust load and to provide relatively low friction engagement to facilitate relative rotation of said members under fluid pressure.

3. The swivel coupling of claim 1 wherein only the radially outer corner of one end of said sleeve contacts said step.

4. The swivel coupling of claim 3 wherein said one end of said sleeve is tapered at an angle of 3° and said step is tapered at an angle of 5° to establish line contact therebetween.

5. The swivel coupling of claim 1 wherein said inner member adjacent and within the end of said sleeve furthest from said step is radially expanded to make sealed engagement within said sleeve and to radially overlap said furthest end thereby to lock said sleeve on said inner member against axial removal therefrom.

6. A swivel coupling comprising a pair of tubular coupling members axially telescopically interfitting each other, the inner one of said members having a shoulder engaging one end of the outer one of said members to limit the extent of such interfitting, said inner member also having a sleeve affixed in sealing contact therearound within said outer member, said outer member having an internal annular groove with the radial wall of said groove nearest said one end of said outer member radially overlapping the outer end of said sleeve for engagement thereby, the distance between said radial groove wall and said one end of said outer member being substantially the same as the distance between said outer end of said sleeve and said shoulder on said inner member to maintain continuous engagement between said radial groove wall and outer end of said sleeve, and a packing ring in said groove in fluid tight sealing contact with the walls of said groove and said sleeve, the interengagement of said radial groove wall and outer end of said sleeve closing said groove against extrusion of said packing ring under the influence of fluid pressure in said coupling.

7. The swivel coupling of claim 6 wherein said outer member is of one-piece construction.

References Cited by the Examiner
UNITED STATES PATENTS

| | | | |
|---|---|---|---|
| 954,549 | 4/1910 | Turner | 285—354 |
| 2,227,105 | 12/1940 | Pritchard | 285—281 |
| 2,273,396 | 2/1942 | Couty | 285—382.4 |
| 2,477,676 | 8/1949 | Woodling | 285—281 |
| 2,748,463 | 6/1956 | Mueller | 29—523 |
| 2,901,273 | 8/1959 | Morris | 285—281 |
| 2,926,935 | 3/1960 | Marre | 285—280 |
| 3,112,127 | 11/1963 | Campbell | 285—158 |
| 3,113,377 | 12/1963 | Oakes | 29—523 |
| 3,151,893 | 10/1964 | Lyon | 285—158 |
| 3,164,400 | 1/1965 | Weaver | 285—219 |

FOREIGN PATENTS

| | | |
|---|---|---|
| 1,285,677 | 1/1962 | France. |
| 333,727 | 3/1921 | Germany. |
| 1,099,473 | 2/1961 | Germany. |
| 1,120,827 | 12/1961 | Germany. |

CARL W. TOMLIN, *Primary Examiner.*

R. GIANGIORGI, *Assistant Examiner.*